March 1, 1938.  M. J. McANENY  2,109,500
HOSE CLAMP
Filed Nov. 12, 1936
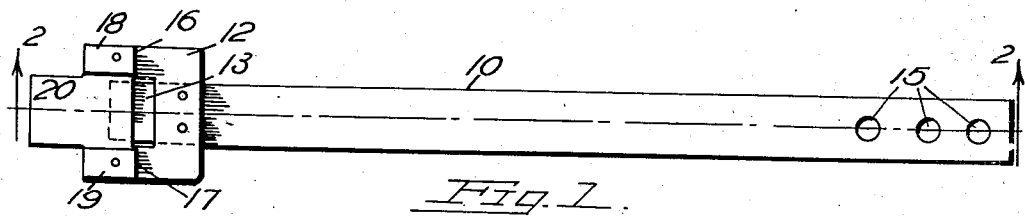
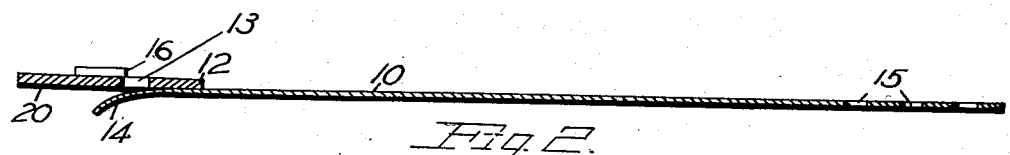
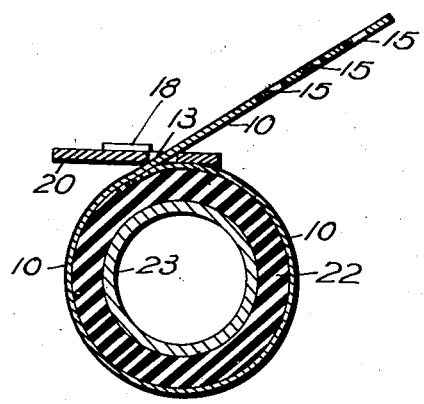
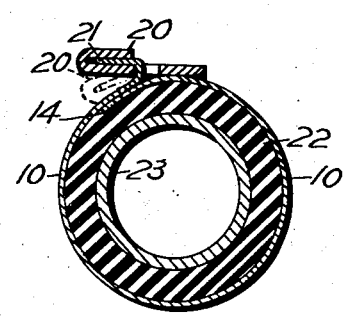
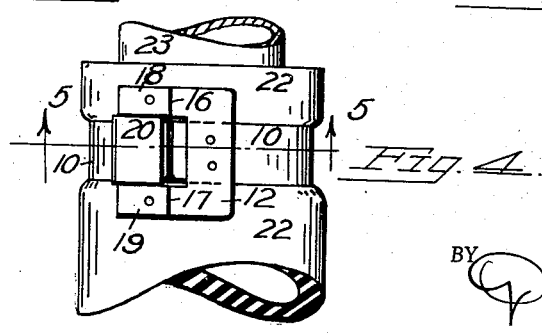
INVENTOR.
MICHAEL J. McANENY
BY
ATTORNEY.

Patented Mar. 1, 1938

2,109,500

UNITED STATES PATENT OFFICE 2,109,500

HOSE CLAMP

Michael J. McAneny, Denver, Colo., assignor to Michael J. McAneny, Jr., Denver, Colo.

Application November 12, 1936, Serial No. 110,480

9 Claims. (Cl. 24—20)

This invention relates to improvements in hose clamps more particularly for use where high pressures are involved.

Where a hose line that is intended to conduct fluid under high pressures, is connected onto a pipe line or any metal nipple there is usually a tendency for a leak to occur between the rubber and the metal and furthermore there is a hazard that the hose may be forced off the metal nipple.

Therefore, it is an object of the present invention to provide a clamp in the form of a band that can be drawn around a hose to clamp it to a pipe or metal nipple to effect a dependably secure union.

Another object is to provide a clamp of this character that can be securely locked in place after it is drawn tight around the hose in a simple manner and with a minimum of effort.

A further object is to make a hose clamp that can be used on any one of various diameters of hose.

A still further object is to supply a hose clamp that is simple and inexpensive and requires to be wrapped around the hose but once to effect a safe union of the hose with a pipe nipple or the like.

Still another object is to provide a hose clamp that will be flat and easy to carry prior to its use on a hose.

Other objects and advantages will be more fully disclosed in the following description and in the drawing wherein like parts have been similarly designated and in which;

Figure 1 is a plan view of the improved clamp-band;

Figure 2 is a sectional view taken along line 2—2 of Figure 1;

Figure 3 is a sectional view showing the clamp-band placed around a hose and ready to be drawn tight;

Figure 4 shows the clamp-band locked in place on a hose; and

Figure 5 is a sectional view taken along line 5—5 of Figure 4.

Reference character 10 denotes a clamp-band of flexible metal such as steel, on which is securely fastened a clamp-head 12, by riveting, welding or any suitable method. The clamp-head is preferably thicker and more rigid than the clamp-band and has a slot-like aperture 13 through which the band may be passed or looped when it is wrapped around a hose 22 and a pipe 23 as shown in Figure 3. One end 14, of the clamp-band extends beyond the point of fastening of the head to the band, and is curved away from the head.

Toward the other end of the band is a series of holes 15 to engage a special tightening tool as disclosed in my co-pending application filed of even date herewith.

The clamp-head is provided with shoulders 16 and 17 on either side of the slot 13 against which the tightening tool abuts during the tightening operation. These shoulders may be formed by turning back the corners of the head as shown at 18 and 19, and riveting or welding them to the plate or securing them in any other suitable manner.

A tongue 20 extends from the plate in alinement with the band and after the band is drawn tightly around the hose it is bent over the edge of the slot 13 and cut off to leave a locking end 21 over which the tongue 20 is then folded or bent to complete the lock as shown in Figures 4 and 5. The locked head-plate may then be hammered down against the contour of the band as shown in dotted lines in Figure 5, if desired.

The locking end of the band passes over or laps the other end 14 of the band to make a complete girth around the hose. The thicker, more rigid metal of the head facilitates the tightening and locking operations by providing a substantial abutment for the tool that can not be drawn into the channel of the tool through which the band itself passes. The rigid side of the slot-like aperture in the head through which the band is looped, furnishes an edge over which the locking end 21 of the band may be securely bent and the locking tongue 20 is of sufficient strength to retain its locked position over the band-end without danger of loosening. The band itself is preferably strong, tough material of considerable flexibility and of thinner and narrower cross section than the head.

The clamp as a whole, remains flat as shown in Figures 1 and 2 until it is applied to a hose. It is therefore easy and convenient to pack, ship, carry and handle prior to use and effects a most efficient joint when used as intended.

What I claim and desire to secure by Letters Patent is:—

1. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, and means for locking said end to the head.

2. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head having projecting from one face thereof shoulders or abutments for engagement by a tool in applying the band.

3. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head provided with a tongue portion adapted to fold over said last mentioned end of the strap and lock the same to the head.

4. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head having portions bent back upon the body of the head and forming abutments or shoulders for engagement by the tool in applying the band, and means for locking said end to the head.

5. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head having portions bent back upon the body of the head and forming abutments or shoulders for engagement by the tool in applying the band, and a tongue portion adapted to fold over the end of the strap and lock the same to the head.

6. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head having portions bent back upon the body of the head and forming abutments or shoulders for engagement by the tool in applying the band, and a tongue portion adapted to fold over the end of the strap and lock the same to the head, said abutments being adjacent to the edge of the slot through which the band is drawn.

7. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot, said head having portions bent back upon the body of the head and forming abutments or shoulders for engagement by the tool in applying the band, and a tongue portion adapted to fold over the end of the strap and lock the same to the head.

8. A hose clamp comprising a relatively rigid head having a slot therein, a bendable strap, said head being attached to said strap at a point intermediate the ends thereof, one end of the strap extending beyond and substantially covering said slot, the other end of the strap being receivable in said slot and provided with tool engaging means, and means for locking said end to the head.

9. A hose clamp comprising a relatively rigid head having a slot therein, a bendable strap one end of which projects from the head, and the other end substantially closing the slot, the first mentioned end of the strap being receivable in said slot, and means for locking said end to the head.

MICHAEL J. McANENY.